US010292879B2

(12) United States Patent
Girardin et al.

(10) Patent No.: US 10,292,879 B2
(45) Date of Patent: *May 21, 2019

(54) WHEELCHAIR PASSENGER SECUREMENT SYSTEM WITH BUMPER

(71) Applicant: Valeda Company, Oakland Park, FL (US)

(72) Inventors: Jean-Marc Girardin, Golden Beach, FL (US); Joe Esteireiro, Weston, FL (US)

(73) Assignee: Valeda Company, LLC, Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,248

(22) Filed: Jul. 28, 2015

(65) Prior Publication Data

US 2015/0328067 A1   Nov. 19, 2015

Related U.S. Application Data

(63) Continuation-in-part of application No. 13/842,407, filed on Mar. 15, 2013, now Pat. No. 9,107,786, and a continuation-in-part of application No. 12/573,881, filed on Oct. 5, 2009, now Pat. No. 8,414,234.

(51) Int. Cl.
| | |
|---|---|
| *A61G 3/08* | (2006.01) |
| *B60P 3/079* | (2006.01) |
| *B60R 22/20* | (2006.01) |
| *B60R 22/22* | (2006.01) |
| *B60R 22/24* | (2006.01) |

(52) U.S. Cl.
CPC ............ *A61G 3/0808* (2013.01); *B60P 3/079* (2013.01); *B60R 22/20* (2013.01); *B60R 22/22* (2013.01); *B60R 22/24* (2013.01); *A61G 2203/723* (2013.01)

(58) Field of Classification Search
CPC ................................ A61G 3/08; A61G 3/0808
USPC ............. 410/2, 3, 4, 7, 9–12, 18, 19, 21–23; 296/65.04; 280/808, 801.2
See application file for complete search history.

(56) References Cited

U.S. PATENT DOCUMENTS

| | | | | |
|---|---|---|---|---|
| 4,019,752 A | * | 4/1977 | Leon ..................... | A61G 3/0808 188/2 F |
| 4,093,303 A | * | 6/1978 | Nelson .................. | A61G 3/0808 224/42.4 |
| 4,103,934 A | * | 8/1978 | Arnholt ................ | A61G 3/0808 280/751 |
| 4,369,995 A | * | 1/1983 | Harder, Jr. ........... | A61G 3/0808 248/503 |
| 4,511,171 A | * | 4/1985 | Petersen .............. | A61G 3/0808 188/2 F |
| 4,730,964 A | * | 3/1988 | Joyner ................. | A61G 3/0808 280/304.1 |
| 4,772,164 A | * | 9/1988 | McFarland .......... | A61G 3/0209 224/536 |

(Continued)

*Primary Examiner* — Hilary L Gutman
(74) *Attorney, Agent, or Firm* — Daniel A. Tallitsch

(57) ABSTRACT

The embodiments described and claimed herein are improved wheelchair passenger securement systems and stations. In particular, one embodiment described and claimed herein includes a mobility aid restraint, a bumper, and a tensioning mechanism, wherein the tensioning mechanism is adapted to pre-tension the mobility aid restraint whereby the wheelchair restraint exerts a force on the mobility aid in a direction at least partly toward the bumper.

13 Claims, 14 Drawing Sheets

(56) References Cited

U.S. PATENT DOCUMENTS

| | | | | |
|---|---|---|---|---|
| 4,995,775 | A * | 2/1991 | Gresham | A61G 3/0808 410/10 |
| 5,388,937 | A * | 2/1995 | Farsai | B60P 3/077 188/32 |
| 5,888,038 | A * | 3/1999 | Ditch | A61G 3/0808 296/65.04 |
| 6,231,283 | B1 * | 5/2001 | Stowers | B60P 3/075 296/65.04 |
| 6,575,677 | B2 * | 6/2003 | Craft | A61G 3/0808 410/18 |
| 6,698,983 | B1 * | 3/2004 | Kiernan | A61G 3/0808 410/12 |
| 6,899,497 | B2 * | 5/2005 | Cardona | A61G 3/0808 410/100 |
| 7,040,847 | B1 * | 5/2006 | Cardona | A61G 3/0808 410/12 |
| 7,455,490 | B1 * | 11/2008 | Goosen | A61G 3/0808 410/7 |
| 7,717,655 | B2 * | 5/2010 | Cardona | A61G 3/0808 410/23 |
| 7,854,576 | B2 * | 12/2010 | Girardin | A61G 3/0808 410/19 |
| 8,911,188 | B1 * | 12/2014 | Mill | A61G 3/0808 410/100 |
| 9,107,786 | B2 * | 8/2015 | Girardin | A61G 3/0808 |
| 9,504,617 | B2 * | 11/2016 | Hammarskjold | B60P 3/079 |
| 9,585,800 | B2 * | 3/2017 | Hammarskjold | A61G 3/0808 |
| 2008/0247837 | A1 * | 10/2008 | Cardona | A61G 3/0808 410/23 |
| 2014/0334893 | A1 * | 11/2014 | Goss | A61G 3/0808 410/7 |
| 2016/0016498 | A1 * | 1/2016 | Hammarskjold | A61G 3/0808 410/7 |

* cited by examiner

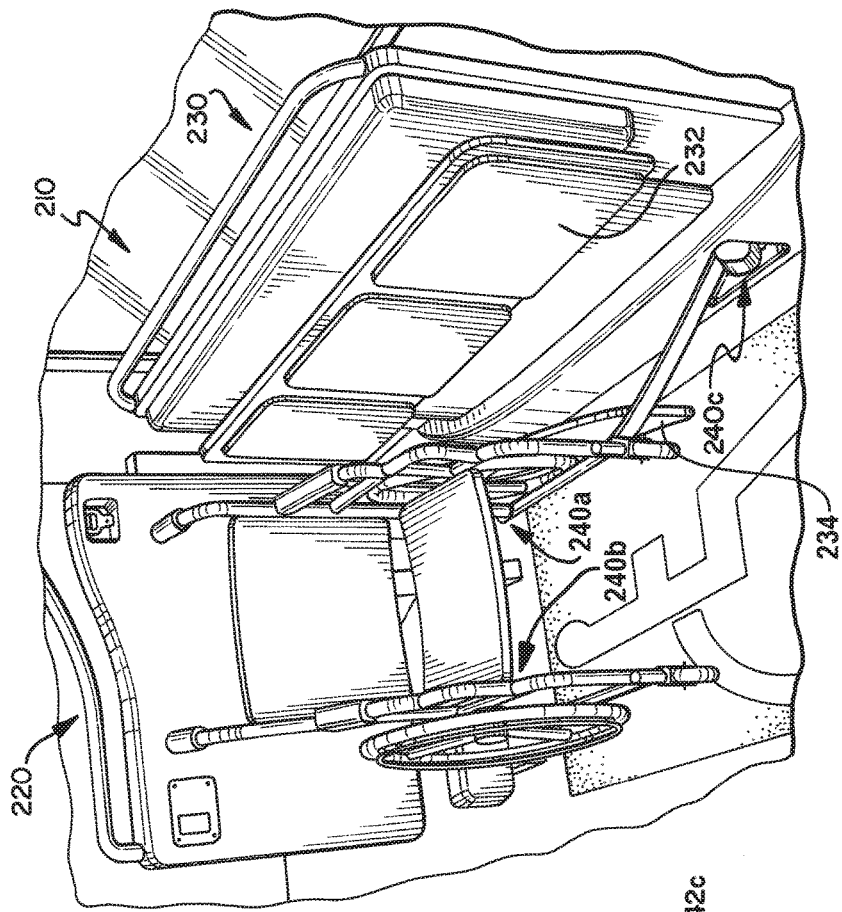
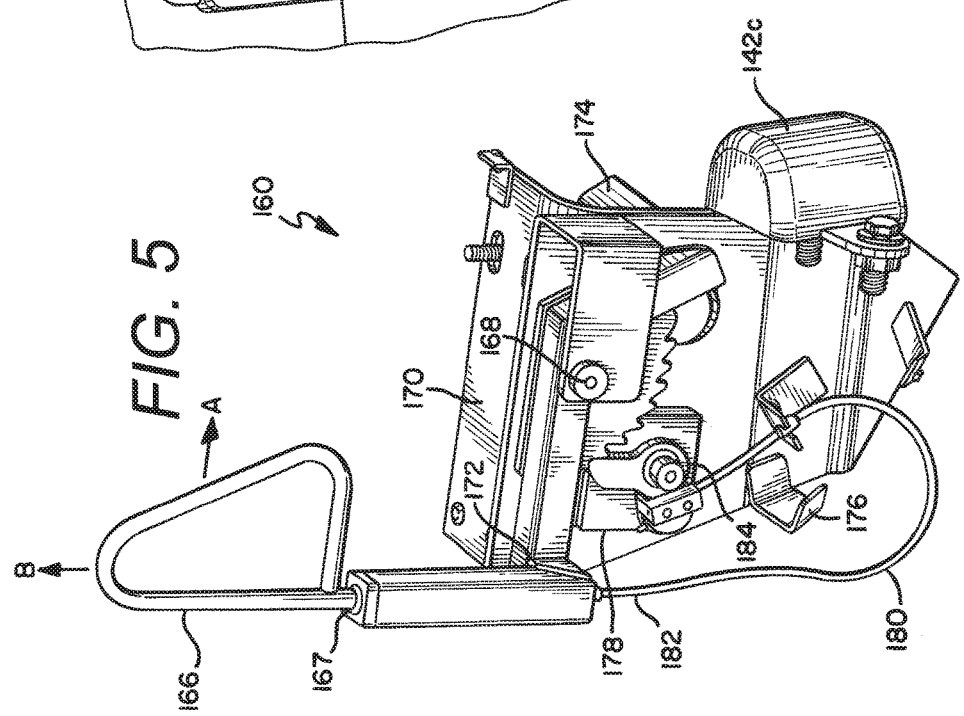

WHEELCHAIR PASSENGER SECUREMENT SYSTEM WITH BUMPER

CROSS-REFERENCE TO RELATED APPLICATIONS

This application is a continuation of and claims priority to:

U.S. application Ser. No. 13/842,407, entitled "3-Point Wheelchair Passenger Securement System", filed on Mar. 15, 2013, now U.S. Pat. No. 9,107,786 which was granted on Aug. 18, 2015;

which is a continuation-in-part of U.S. application Ser. No. 12/573,881, entitled "3-Point Wheelchair Passenger Securement System", filed Oct. 5, 2009, now U.S. Pat. No. 8,414,234 which was granted on Apr. 9, 2013;

which claims priority to U.S. Provisional Patent Application No. 61/102,853, entitled "3-Point Wheelchair Passenger Securement System" filed Oct. 5, 2008.

Together, U.S. application Ser. Nos. 12/573,881 and 61/102,853 are hereby incorporated by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTIONS

Technical Field

The embodiments described and claimed herein relate generally to wheelchair passenger securement methods, systems, and devices for vehicles. More specifically, at least some of the embodiments described herein relate to a method, system, or device for securing a wheelchair passenger in a vehicle (train, bus, van, plane, etc.) using a bumper.

Background Art

The Americans with Disabilities Act (ADA) mandates that all public transit service providers must accommodate persons with disabilities, including those who must use a wheelchair as their seat in the transport vehicle. ADA also mandates that, for the safety of the wheelchair user and near-by passengers, the wheelchair must be secured so that it will not move more than 2" in any direction during normal vehicle operation. In addition, restraints must be attached to the wheelchair—historically two in front and two in the rear—that are sufficiently strong to keep it secured in the event of a crash event.

Current systems on the market generally use a four-point system where two restraints are used to secure the front of the wheelchair and two are used to secure the rear of the wheelchair (one on each "corner" of the wheelchair). In that respect, the current systems utilize four attachment points on the vehicle, four attachment points on the wheelchair, and four restraints extending between each respective vehicle attachment point and wheelchair attachment point. The prior art four-point systems are considered by many to be relatively cumbersome and time-consuming to secure, especially if the system is used on a public transit vehicle where dwell times are critical.

The prior art four-point systems suffer from numerous problems or short-comings. For example, the four-point systems utilize two restraint devices for securing the front of the wheelchair, one on the wall-side of the wheelchair and one on the aisle-side of the wheelchair. The use of the additional aisle-side restraint increases the cost of installation (more components and labor), poses a significant obstacle and tripping hazard for wheelchairs and other passengers, and requires more time to secure the chair (increasing vehicle dwell time and the potential for driver injuries while attempting to secure the device). Some have attempted to solve this problem by mounting the aisle-side restraint device to a retractable arm, such as the one disclosed in U.S. Pat. No. 5,888,038, but such a system adds unnecessary expense and still poses a potential tripping hazard.

Others have attempted to vary from the traditional four-point systems with limited success. See, for example, the systems described in U.S. Pat. Nos. 4,060,271; 4,257,644; 4,427,210; 4,492,403; 4,688,843; 4,265,478; 5,026,225; and 6,113,325. One of the attempted solutions utilizes three attachment points on the vehicle. For example, the system disclosed in U.S. Pat. No. 6,113,325 ("the '325 patent") utilizes three vehicle attachment points or restraint devices (two in the front, one in the rear). However, this system still suffers from the same problems as the traditional four-point system since it also requires the use of a coupling, or some other device, such as a "Y" belt (see reference number 48 in U.S. Pat. No. 6,113,325). Although the coupling is only secured at one end to the single rear restraint device, the coupling is configured to secure the rear of the wheelchair at two wheelchair attachment points. In such systems, there are still effectively four attachment points to the wheelchair. Therefore, such systems are still relatively cumbersome and time-consuming to use. Plus, these systems are inherently weaker than the traditional four-point systems (four vehicle attachment points/four wheelchair attachment points) since they utilize only one restraint device to secure the rear of the wheelchair, where more strength is required to sufficiently restrain the wheelchair during emergency braking events. Also, if the coupling or "Y" belt is not permanently attached, there is the potential to lose the component, rendering the system useless. Further, the vehicle operator must still attach four restraints to the wheelchair as in conventional systems, as well as connect the additional coupling to the rear restraint device. In fact, it is believed that such a configuration may actually increase dwell time and potential for driver injury as compared to traditional four-point systems. Even further, the configuration of these prior art systems are quite complex, which increases the opportunity to use it improperly. It should not be forgotten that driver error is one of the most predominant causes of wheelchair tip-overs in the industry.

U.S. Pat. No. 4,257,644 ("the '644 patent") also discloses a system utilizing three vehicle attachment points. However, this prior art system utilizes manually operable restraints and coffers, or covered floor pockets, that are bulky, difficult to use, can pose a significant tripping hazard, and require an extra installation as compared to the embodiments described herein. Like the prior art system of the '325 patent, the system disclosed in the '644 patent also only uses a single vehicle attachment point to secure the rear of the wheelchair and is therefore inherently weak. As discussed above, in typical wheelchair securement systems, where the wheelchair passenger is forward facing in the vehicle, more strength is required to secure the rear of the wheelchair, as opposed to the front, to withstand emergency braking events.

BRIEF SUMMARY OF THE INVENTIONS

The embodiments described and claimed herein solve at least some of the problems of the prior art wheelchair restraint systems. In simple terms, the embodiments described and claimed herein utilize three vehicle attachment points and three wheelchair attachment points to effectively secure a wheelchair. Instead of using a fourth wheelchair attachment point like the prior art, the present system may also use a fourth contact or touch point between the wheelchair and a side barrier. The side barrier may be a part of the vehicle itself (such as a side-wall) or could be a separate structure that is rigidly or movably fixed to the vehicle.

In one particular embodiment described and claimed herein, two of the vehicle attachment points and two of the wheelchair attachment points are provided at the rear of the wheelchair, where the most strength is needed for forward facing applications. It has been found that front restraints in most instances mainly come into play on rebound and primarily find use to prevent the front of the wheelchair from swinging out into the aisle. Therefore, only having one vehicle attachment point and one wheelchair attachment point at the front of the wheelchair is sufficient.

The configurations described and claimed herein are simpler to use than the prior art systems since they utilize fewer points of attachment to the vehicle and wheelchair. For the present systems, the opportunity for the driver to improperly secure the wheelchair and to suffer injury is reduced, since there is one and sometimes two less devices to bend down and attach and/or activate. Further, the potential tripping hazard for other passengers and potential liability for vehicle operators is reduced. Even further, utilization of the presently described configurations reduces the amount of installation time required and the maintenance needed for the vehicle's owner.

In one embodiment, a drop-in system comprising a barrier module and a side-wall module is provided. The system is configured for forward-facing securement of a wheelchair (relative to the direction of travel of the vehicle), where the back of the wheelchair is adjacent the barrier module and the side-wall module is adjacent the wall of the vehicle. The barrier module is provided with two tie-down (or securement or restraint) devices for securing the wheelchair from two points, such as the two rear corners of the wheelchair. The side-wall module is provided with a single tie-down device, which is spaced a distance forward from the barrier module, for securing the wheelchair at a single point, such as the front wall-side corner of the wheelchair.

In another embodiment, a similar drop-in system is provided, except that the embodiment includes a movable side barrier, which has a retracted position towards a wall of the vehicle, and an extended position in which the side barrier contacts and exerts a force onto the wheelchair (in a direction away from the wall) to induce pretension in the previously-attached tie-down devices.

In yet another embodiment, a similar drop-in system is provided, except that the side barrier of the third embodiment is fixed, rather than movable.

In yet another embodiment, a similar drop-in system is provided, except that the embodiment includes a pull-mechanism that exerts a force on the single tie-down device (for example, in a direction towards the wall), whereby urging the wheelchair towards the wall (or side barrier) and inducing pre-tension into the tie-down device. The pull-mechanism may be a part of the side barrier or could be a separate structure that is rigidly or movably fixed to the vehicle. Even further, the mechanism inducing pre-tension may be activated by foot and/or hand and be electric, electro-mechanical, or mechanical.

In yet another embodiment, a more simple system is provided which includes three tie-down devices arranged in a generally right-triangular configuration, two at the rear of the wheelchair and one at the front of the wheelchair. The tie-down devices can be mounted to any structure of the vehicle, such as the floor or wall.

In yet another embodiment, a single front tie down is provided in combination with a retractable anchor, onto which two rear tie-down devices are attached. In one instance, the retractable anchor includes a housing, which is attached to some portion of the vehicle, such as the floor. The retractable anchor also includes an extendable member, or arm, which is configured to telescope into the housing. The arm is configured to retract into the housing to eliminate a potential tripping hazard for non-wheelchair passengers and to eliminate an obstacle for wheelchair passengers. One of the two tie-down devices would be connected to the housing, and the other to the arm.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEW OF THE DRAWINGS

These and other features, aspects, objects, and advantages of the embodiments described and claimed herein will become better understood upon consideration of the following detailed description, appended claims, and accompanying drawings where:

FIG. 5 is a perspective view of the pull mechanism for the second embodiment;

FIG. 6 is a perspective view of a third embodiment of a three-point wheelchair securement system, which includes a movable lateral barrier;

Figure 1:
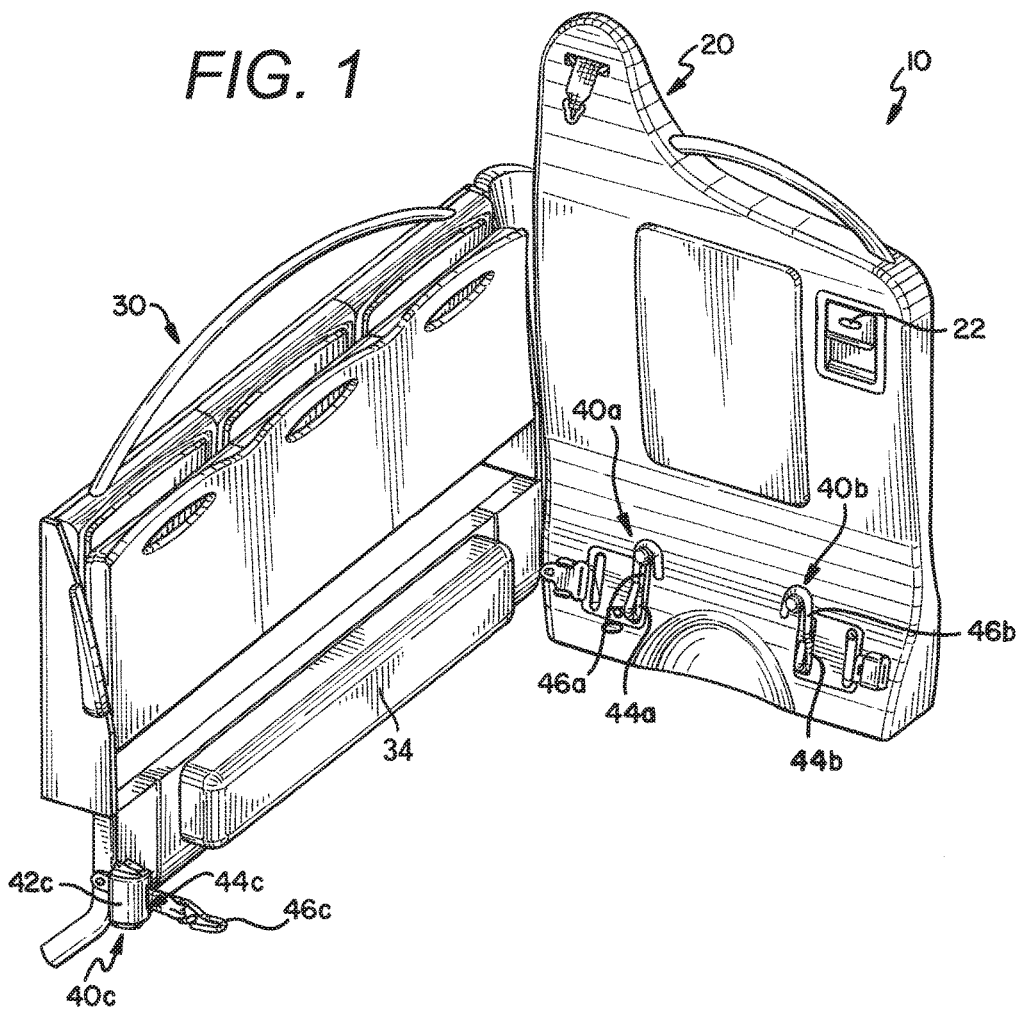
FIG. 1 is a perspective view illustrating a first embodiment of a three-point wheelchair securement system, which includes a barrier module and a side-wall module.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE INVENTIONS

Figure 2:
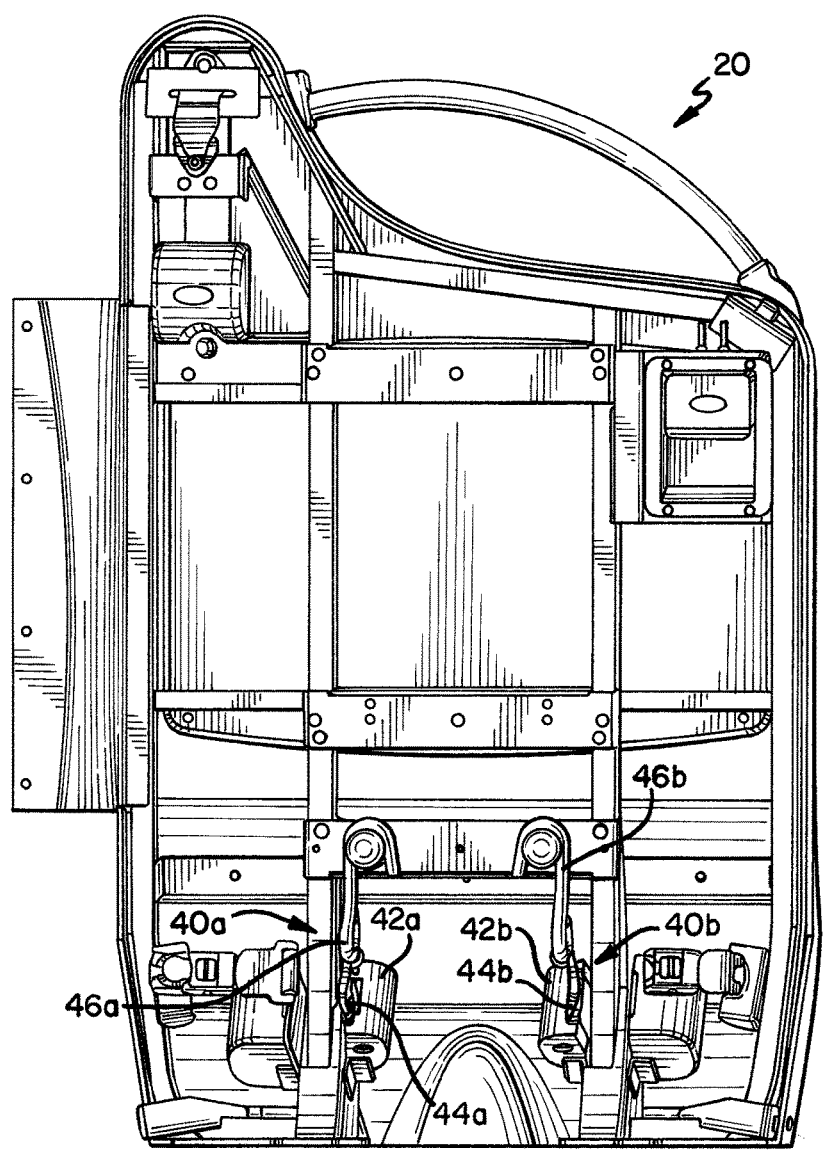
FIG. 2 is a front view of the barrier module with portions of the front panel removed.

Referring first to FIGS. 1 and 2, a first embodiment of a three-point wheelchair securement system (or station) 10 is shown for securing a wheelchair and its occupant in a vehicle, such as a bus, van, train, aircraft, boat, or the like. The first embodiment of the wheelchair securement system 10 includes a barrier module 20 and a side-wall module 30. With certain exceptions discussed herein, the barrier and side wall modules 20, 30 of the first embodiment are substantially similar to those described in co-pending U.S. patent application Ser. No. 11/847,435, which is incorporated herein in its entirety.

In the first embodiment, the wheelchair securement system 10 is best characterized as a drop-in system for a vehicle which is fully-equipped to secure a wheelchair and its passenger in a forward facing orientation (i.e., with respect to the direction of travel of the vehicle). In this orientation, the barrier module 20 is forward-facing (i.e., positioned rearward of the side-wall module 30 in the vehicle) and secures the wheelchair at two attachment points at the rear of the wheelchair. Although shown in a configuration suitable for installation adjacent a right side wall of a vehicle, the system 10 could be configured as a mirror image of the shown configuration for installation adjacent a left side wall of the vehicle. The side-wall module 30 is positioned adjacent to a wall of the vehicle and secures the wheelchair at a single attachment point at the front of the wheelchair. The barrier module 20 and side-wall module 30, through the use of three points of attachment to the wheelchair, work in conjunction to adequately secure the wheelchair in compliance with the ADA and to prevent significant movement, twisting, or tipping of the wheelchair.

To facilitate simple installation, the shown system 10 is intended to be substantially assembled for a vehicle manufacturer (or retrofitter) and needs only to be mounted or bolted into place without any further significant installation. To achieve this end in a cost-effective manner, the barrier module 20 and side-wall module 30 are provided or shipped as separate units, which are connected together by the installer. However, it is contemplated that alternative embodiments could comprise pre-integrated barrier and side-wall modules or barrier and side-wall modules which are not configured for interconnection.

The first embodiment of the wheelchair securement system 10 includes a side-wall arrangement with seats to make most efficient use of vehicle space. In that respect, the area designated for the wheelchair passenger system 10 can be used for other passengers, sitting and/or standing, when it is not needed for a wheelchair passenger. The side-wall module 30 of the first embodiment incorporates a fold-up seat 32, so that the seat 32 can be positioned out of the way when a wheelchair passenger boards the vehicle. It is, however, contemplated that other seating arrangements could be used, such as forward facing seating. For example, the barrier module 20 could be provided with a similar stowable seat, which can be moved out of the way when the wheelchair securement system 10 is needed.

The wheelchair securement system 10 includes three securement (or tie-down) assemblies 40a, 40b, 40c which work in conjunction to adequately secure a wheelchair in compliance with the ADA. In the first embodiment, each of the three securement assemblies 40a, 40b, 40c comprises a refractor 42a, 42b, 42c. Each refractor 42a, 42b, 42c includes several feet of webbing (or strap) 44a, 44b, 44c, at a terminal end of which is provided a wheelchair engaging member 46a, 46b, 46c which could be any type of fastener. The shown wheelchair engaging member or fastener is an anchor (or S-hook or J-hook) which can be easily attached to and easily removed from any portion of a wheelchair, such as a structural member. Refractors suitable for use in this application include Q'Straint's QRT Series refractors (see www.qstraint.com). As an alternative to the refractors shown herein, manually-adjustable straps can be used, such as Q'Straint's Q-5000 and M-series belt systems.

The retractors 42a, 42b, as shown, are mounted internal to the barrier module 20. The only portion of the securement assemblies 40a, 40b that protrude from the barrier modules 20 are the restraint straps 44a, 44b, and the wheelchair engagement members 46a, 46b. The refractor 42c, as shown, is mounted to the leg of the side-wall module 30, underneath the fold-up seat 32. This configuration substantially reduces the potential tripping hazard for passengers, as compared to prior art systems which include exposed refractors.

While the depictions of the first embodiment show the refractors 42a, 42b mounted internal to the barrier module 20, it is contemplated that other embodiments could include refractors mounted external to the barrier module 20. Moreover, while the refractor 42c is shown mounted to the leg of side-wall module 30, it is contemplated that the refractor 42c could be mounted to any other portion of the module 30 or to any other component of the vehicle, such as the wall or floor. Indeed, as shown in the figures and described in more detail below, the more simple embodiments of the claimed securement systems may not include a barrier or side-wall module 20, 30 at all. Such simple embodiments could consist of three securement assemblies which are mounted in a generally triangular pattern in the vehicle. The securement assemblies can be fastened to any surface or structure of the vehicle, including the floor and walls.

While the refractors 42a, 42b, 42c could theoretically be mounted directly to a floor surface of the vehicle, with the claims covering such a configuration, it has been found that better performance can be obtained by spacing the refractors 42a, 42b, 42c a distance from the floor, a configuration espoused by the first embodiment of the wheelchair securement system 10. However, the refractors 42a, 42b, 42c should be spaced a slight distance below the wheelchair structure to which the wheelchair engaging members 46a, 46b, 46c will be attached. In other words, it is preferable that the restraint strap 44a, 44b, 44c be slightly angled upwards towards the wheelchair so that the securement assembly 40a, 40b, 40c can exert a downward force on the wheelchair.

The barrier module 20 of the first embodiment also includes a remote control device with a release latch (or paddle handle) 22 for releasing one or more of the securement assemblies 40a, 40b, 40c. For example, the embodiments could include any of the systems described in U.S. provisional patent application Ser. Nos. 60/705,452, U.S. provisional patent application No. 60/618,572, U.S. patent application Ser. No. 11/252,326, and/or PCT patent application no. PCT/US06/30085, which are all incorporated in their entirety herein by reference.

The first embodiment of the wheelchair securement system 10 also includes a side barrier (or pad or bumper) 34. The side barrier 34 can be constructed of any material and can be rigid, soft and/or resilient. For example, the side barrier 34 could comprise high density polyurethane foam similar to car head rests, and could be covered with fabric. Alternatively, a metal, plastic, or rubberized structure could be used.

The side barrier 34 can serve one or more of many different functions. For example, as shown, the barrier serves at least two purposes. First, the barrier 34 provides spacing between the wheelchair and the vehicle wall (and/or the side-wall module 30). The spacing between the wheelchair and the wall/side-wall module 30 that is provided by the side barrier 34 serves to prevent injury to the wheelchair passenger in an accident, should an appendage find its way therebetween. Second, the barrier 34 resists lateral and/or rotative movement of the wheelchair towards the vehicle wall. Ideally, although not necessarily, the wheelchair will be in close proximity or will actually touch the side barrier 34 when properly secured.

In the shown embodiment, it is contemplated that the side barrier 34 would have resilient properties, wherein it would have some give, but still provide firm support for the wheelchair. In an alternative embodiment, the side barrier 34 could be biased outward using, for example, a spring that pushes the side barrier 34 outward. When the front restraint 40c was hooked up and would pull the chair in, the springs would provide an opposing force to stabilize the chair. As discussed below at least in the context of the second embodiment, the side barrier 34 could also be mechanized or inflatable, wherein it is movable to positively contact the wheelchair and induce pre-tension into the securement assemblies 40a, 40b, 40c.

Figure 3:
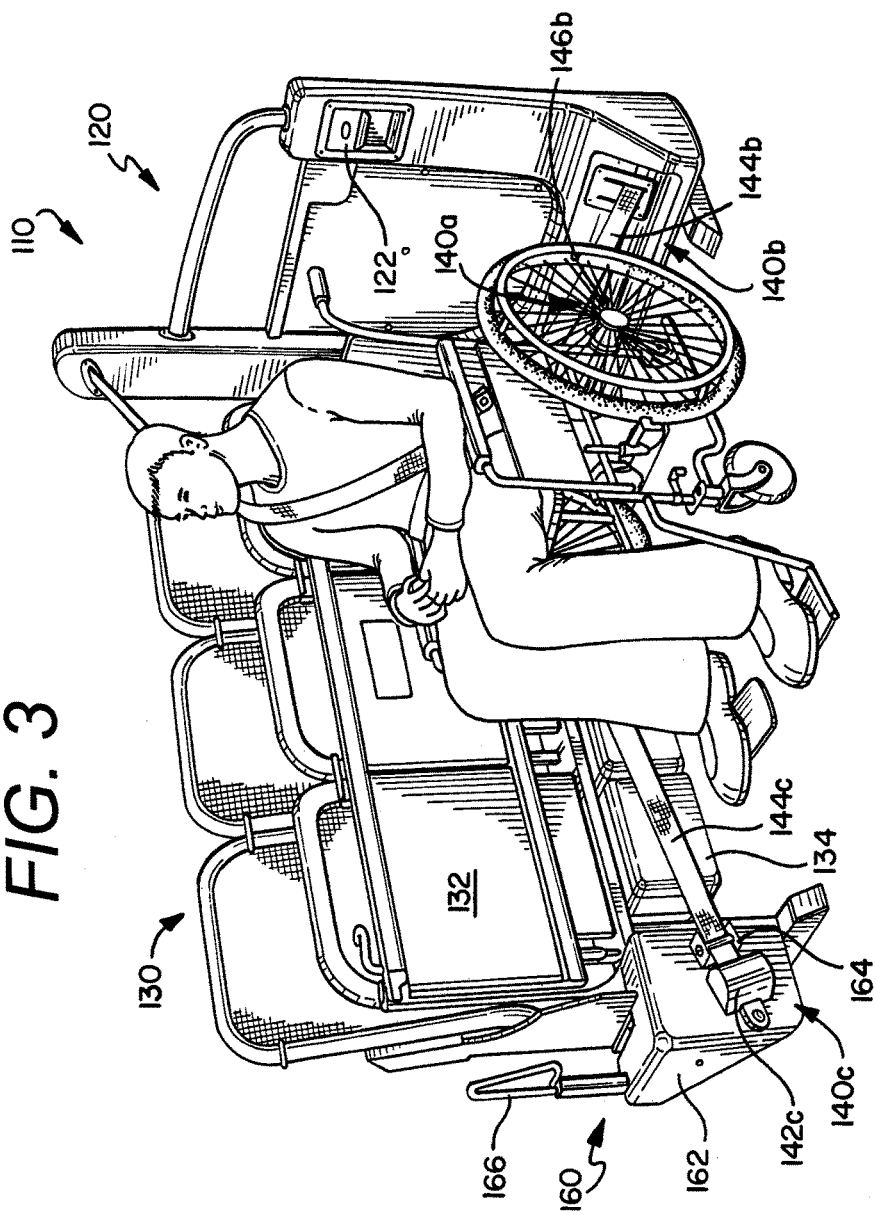
FIG. 3 is a perspective view illustrating a second embodiment of a three-point wheelchair securement system, which includes a barrier module, a side-wall module, and a pull mechanism, with a properly secured wheelchair passenger.
Figure 4:
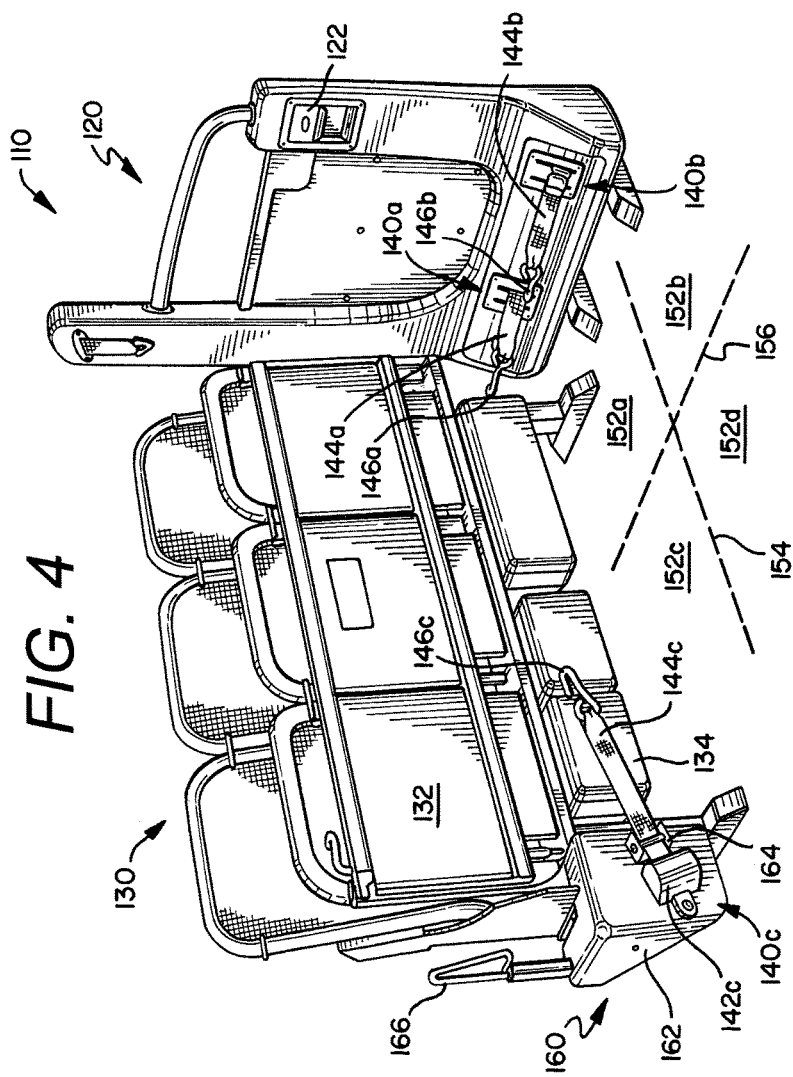
FIG. 4 is a second perspective view of the second embodiment of the three-point wheelchair securement system, with the wheelchair passenger shown transparent.

With reference now to FIGS. 3-4, a second embodiment of a wheelchair securement system 110 is shown. Like the first embodiment, the second embodiment includes a barrier module 120 and a side-wall module 130 that are substantially similar to those described in co-pending U.S. patent application Ser. No. 11/847,435. In addition, the second embodiment of the wheelchair securement system 110 is intended to be a drop-in system and, through the use of three points of attachment to the wheelchair, work in conjunction to adequately secure the wheelchair in compliance with the ADA and to prevent significant movement, twisting, or tipping of the wheelchair.

More specifically, the wheelchair securement system 110 includes three securement (or tie-down) assemblies 140a, 140b, 140c which work in conjunction to adequately secure a wheelchair in compliance with the ADA. Each of the three securement assemblies 140a, 140b, 140c comprises a refractor 142c, although two of the refractors are mounted internal to the barrier modules in a similar manner as in the first embodiment, and are therefore not shown. Each refractor 142c includes several feet of webbing (or strap) 144a, 144b, 144c, at a terminal end of which is provided a wheelchair engaging member 146a, 146b, 146c which could be any type of fastener.

The second embodiment of the wheelchair securement system 110 also includes at least one side barrier or pad 134. The side barrier 134 can be constructed of any material, although as shown the side barrier comprises a rubber material. The second embodiment includes a front restraint mechanism 160, disposed within housing 162, that is adapted to pull the wheelchair into contact with the side barrier through use of the strap guide 164. The refractor 142c, as shown, is mounted to the housing 162 for the front restraint mechanism 160, positioned slightly forward of the strap guide 164. In this configuration, the strap 144c extends from the retractor 142c, through the strap guide 164, and to the wheelchair, where the wheelchair engaging member 146c is attached to the wheelchair. Manipulation of a handle 166 for the mechanism 160 causes the strap guide 164 to retract into the housing 162, thereby drawing up any slack in the strap 164c and pulling the wheelchair flush up against the side barrier 134. In this configuration, the wheelchair is most secure since tension is introduced into the restraints 140a, 140b, 140c and the contact between the barrier 134 and the wheelchair will limit lateral movement towards the wall, both during normal and emergency driving events.

As with the first embodiment, the second embodiment of the barrier module 120 includes a remote control device with a release latch (or paddle handle) 122 for releasing one or more of the securement assemblies 140a, 140b, 140c, such as any one of the systems described in U.S. provisional patent application Ser. Nos. 60/705,452, U.S. provisional patent application No. 60/618,572, U.S. patent application Ser. No. 11/252,326, and/or PCT patent application no. PCT/US06/30085.

Referring now primarily to FIG. 4, the second embodiment of the wheelchair securement station 110 is shown with a wheelchair properly secured therein, although the wheelchair has been made transparent for purposes of clarity. As previously described, the wheelchair is forward facing in the vehicle. With this orientation in mind, one can envision the wheelchair as having four quadrants 152a, 152b, 152c, 152d, which are defined by the longitudinal axis 154 and lateral axis 156 of the wheelchair. The securement assemblies 140a, 140b, 140c attach to the wheelchair at three points, one point within three of the four quadrants 152a, 152b, 152c, 152d of the wheelchair. The first two attachment points are at the rear of the wheelchair, i.e., the engaging member 146a of the securement assembly 140a engages with the wheelchair in the rear right-side quadrant 152a (which in this particular case is also the rear wall-side quadrant 152a) and the engaging member 146b of the securement assembly 140b engages with the wheelchair in the rear left-side quadrant 152b (which in this particular case is also the rear aisle-side quadrant 152b). The third attachment point is at the front of the wheelchair. As shown, the engaging member 146c of the securement assembly 140c engages with the wheelchair in the front right-side quadrant 152c (which in this particular case is also the front wall-side quadrant 152c), although it is contemplated that the front left-side quadrant 152d (which in this particular case is also the front aisle-side quadrant 152d), or the dividing line therebetween, could be engaged in the alternative. However, it is believed that greater tip resistance can be achieved by locating the third attachment point as near as possible to the front-right corner of the wheelchair when the wall is adjacent to the right side of the wheelchair. Likewise, when the wall (and the associated side barrier 134) is adjacent to the left side of the wheelchair, it is believed that greater tip resistance can be achieved by locating the third attachment point as near as possible to the front-left corner of the wheelchair.

With reference now to FIG. 5, a first embodiment of the front restraint mechanism 160 is shown with several components omitted for purposes of clarity, including the housing 162 and strap guide 164, which are clearly shown in FIGS. 3-4. The mechanism 160 is a pivot mechanism consisting essentially of a link 170 that pivots about pin 168. At a first, or upper end 172 of the link 170, a handle 166 for operating the mechanism 160 is attached. At a second, or lower end 174 of the link, the strap guide 164 is attached (although not shown). A person of ordinary skill in the art would understand that pulling handle 166 in the direction A causes the second end 174 of the link 170, and thus the strap guide 164, to rotate clockwise about the pin 168. When the handle 166 is pulled in direction A, the strap guide 164 extends into the housing 162 for the mechanism 160 which, as discussed earlier, induces pre-tension into the securement assembly 140c. Rigidly fixed to the underside of the link 170 is a ratchet 176 that is configured to engage with a pawl 178. The ratchet 176 and pawl 178 are configured to allow clockwise movements of the link 170 and to prevent counter-clockwise movements of the link 170. The mechanism 160 further includes a cable 180, attached at one end 182 to the lower end 167 of the handle 166, and at its opposite end 184 to the pawl 178. A person of ordinary skill in the art would understand that pulling on the handle 166 in direction B would cause the pawl 178 to release from the ratchet 176, thereby allowing the link 170 to be rotated counter-clockwise to release the pre-tension from the securement assembly 140c.

Turning now to FIG. 6, a third embodiment of a wheelchair securement station 210 is depicted. The third embodiment 210 is quite similar to the first and second embodiments, in that it includes a barrier module 220, a side-wall module 230 with a fold-up seat 232, and three securement (or tie down) assemblies 240a, 240b, 240c, two assemblies 240a, 240b (hidden from view) for tying down the rear of the wheelchair and one 240c for tying down the front of the wheelchair. However, unlike the first embodiment, the securement assemblies 240a, 240b are not mounted internal to the barrier module 220, but are instead mounted external to the barrier module 220 on its leg supports.

Also, the securement station 210 includes a side barrier 234 which is disposed on the wall side of the vehicle below the flip-seat 232 and which is movable between a refracted and extended position. In FIG. 6, the side barrier 234 is shown in the extended position where it positively contacts the wheelchair and induces tension into the securement assemblies 240a, 240b, 240c. In a refracted position, the barrier would be positioned generally parallel with the wall of the vehicle. Any means known in the mechanical arts could be used to provide motive force for the side barrier 234, including springs and various types of actuators, including pneumatic cylinders and linear actuators. As an alternative, the movable barrier 234 could comprise an inflatable bellows.

Figure 7:
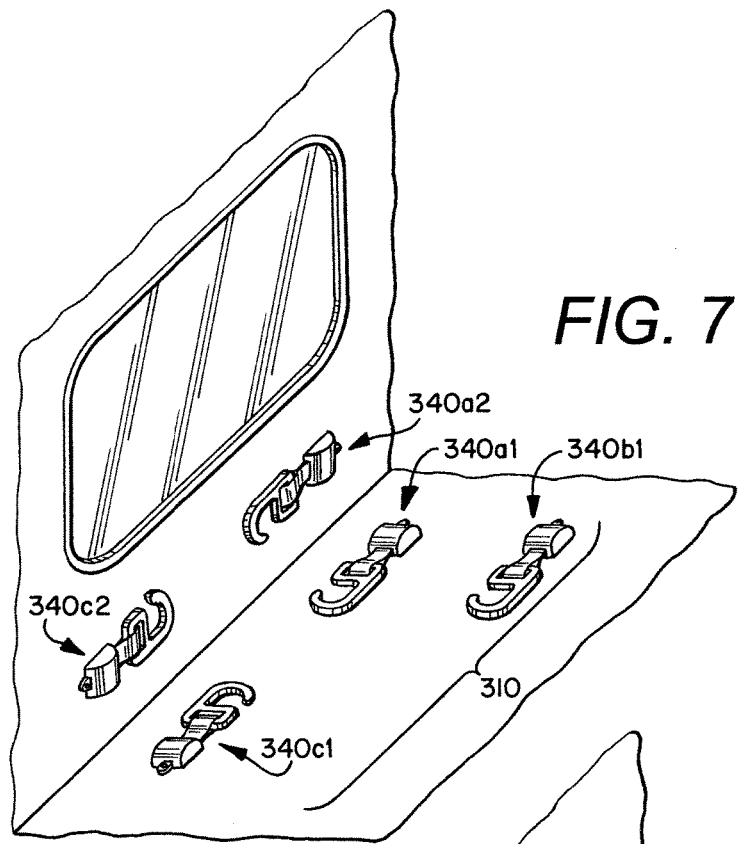
FIG. 7 is a perspective view of a fourth embodiment of a three-point wheelchair securement system, which includes three wall or floor-mounted retractors.

Turning now to FIG. 7, a fourth embodiment of a wheelchair securement station 310 is depicted. The station 310 presents a much more simple configuration than presented by the previously described embodiments and includes three securement assemblies 340a1 or 340a2, 340b, 340c1 or 340c2 aligned in roughly a right-triangle configuration. Like the earlier embodiments, the securement assemblies 340a1 or 340a2, 340b, 340c1 or 340c2 can be refractors. While the earlier embodiments show the refractors attached to various barrier and side-wall modules, the refractors 340a1 or 340a2, 340b, 340c1 or 340c2 of the fourth embodiment can be mounted to any structure in the vehicle; for example, the refractors could be floor or wall mounted. In such configuration, the retractors 340a1 or 340a2, 340b, 340c1 or 340c2 can be directly attached to the wall or floor, or could be attached to the wall or floor using track structures or pocket anchorages. For example, in one installation, Q'Straint's "L" track structure or Slide N' Click pocket anchorages could be used. A bracket of some type could be used to ensure the angle and position of the refractor is optimal.

Although possible, it is not intended that the fourth embodiment 310 will be used in isolation. Indeed, it is contemplated that the refractors 340a1 or 340a2, 340b, 340c1 or 340c2 could be placed below various seating and/or barrier modules. For example, the simple configuration of the fourth embodiment has practical application for retrofitting vehicles having existing seating structures.

Figure 8:
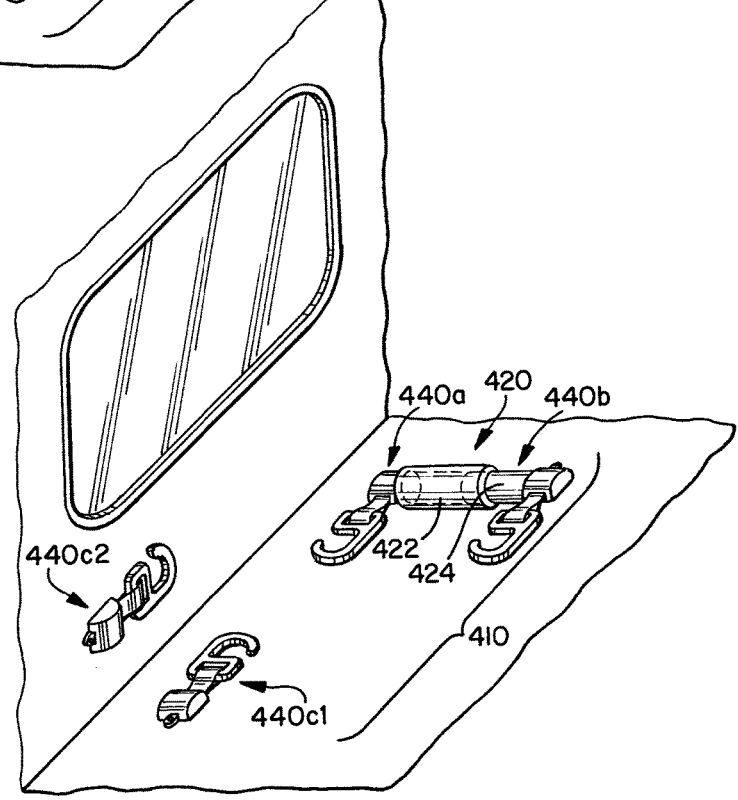
FIG. 8 is a perspective view of a fifth embodiment of the three-point wheelchair securement system, which includes a telescoping arm and a wall or floor-mounted retractor.

With reference now to FIG. 8, a fifth embodiment of the wheelchair securement station 410 is shown. The station 410 is similar to the third embodiment, in that it includes three securement assemblies, which as shown are refractors 440a, 440b, 440c1 or 440c2. The forward-most securement assembly 440c1 or 440c2 could be attached to any structure in the vehicle, including the floor or wall. Also like the third embodiment, the fifth embodiment 410 has practical application for retrofitting vehicles having existing seating structures.

The fifth embodiment 410 differs from the previous embodiments in that it includes a retractable anchor 420 for securing the rear-side of the wheelchair, such as the one described in U.S. patent application Ser. No. 11/776,223, which is incorporated in its entirety herein by reference. In the alternative, other retractable anchors could be used, such as the ones shown and described in U.S. Pat. Nos. 5,888,038;

6,113,325; 6,149,359; 6,428,254; 6,575,677; and 6,966,733. As shown, the retractable anchor 420 has two main structural components: the housing 422 and the arm 424. The arm 424 is generally adapted to retract inside of the housing 422 when the anchor 420 is not being used to restrain a wheelchair, in order to increase the available floor space for non-wheelchair passengers. Onto each of the housing 422 and arm 424 is mounted a securement assembly 440a, 440b. When the retractable anchor 420 is fully extended, as shown, the securement assembly 340b is properly positioned for attachment to a wheelchair.

Turning now to FIGS. 9-15, a sixth embodiment of the wheelchair securement station 610 is shown. Like the second embodiment, the sixth embodiment includes a barrier module 620 and a side-wall module 630 that are substantially similar to those described in co-pending U.S. patent application Ser. No. 11/847,435, and is intended to be a drop-in system. Also like the second embodiment, the sixth embodiment of the wheelchair securement system 610 uses three points of attachment to the wheelchair, which work in conjunction with a side barrier 634 and/or a front restraint mechanism, or tensioner assembly, 160 to adequately secure the wheelchair in compliance with the ADA and to prevent significant movement, twisting, or tipping of the wheelchair.

Figure 10:
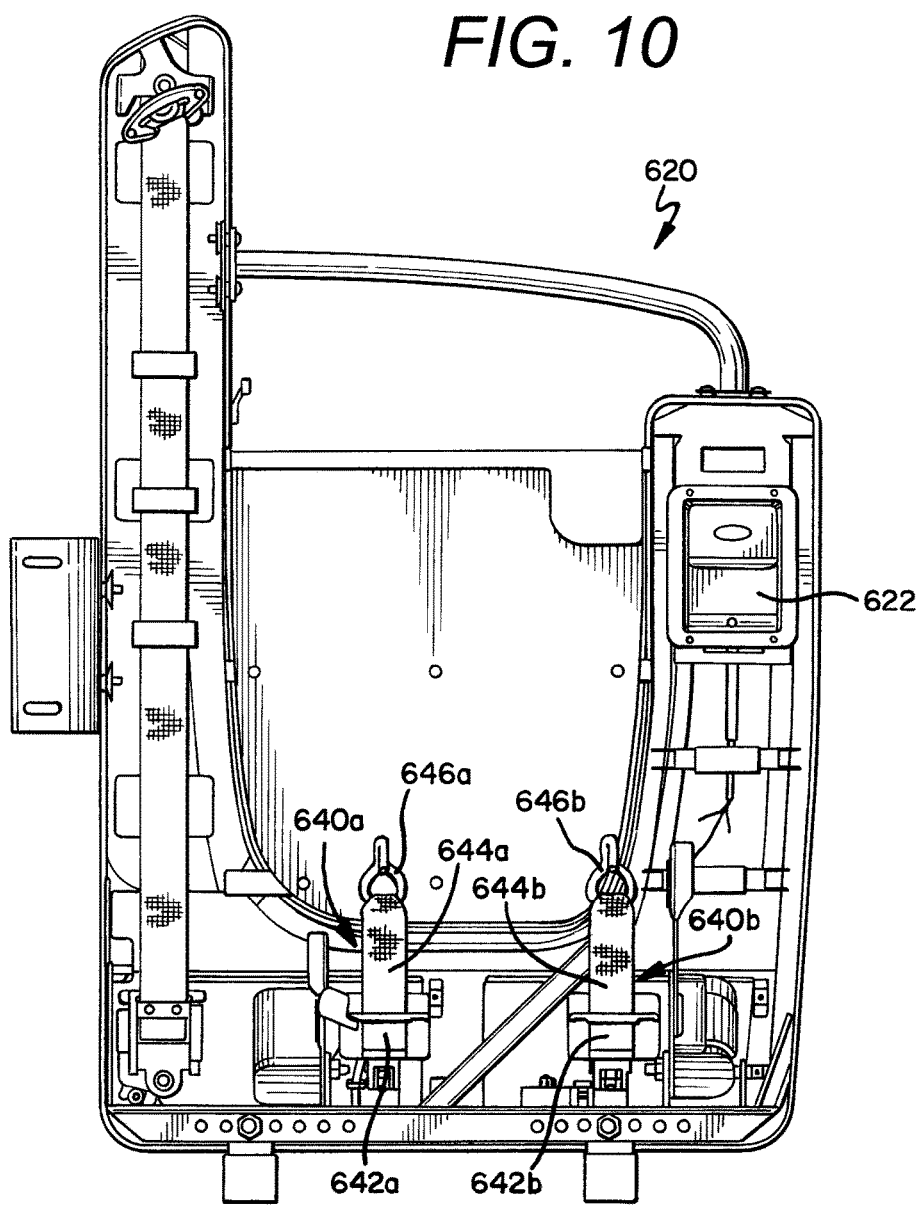
FIG. 10 is front view of the sixth embodiment of the barrier module with portions of the front panel removed.
Figure 11:
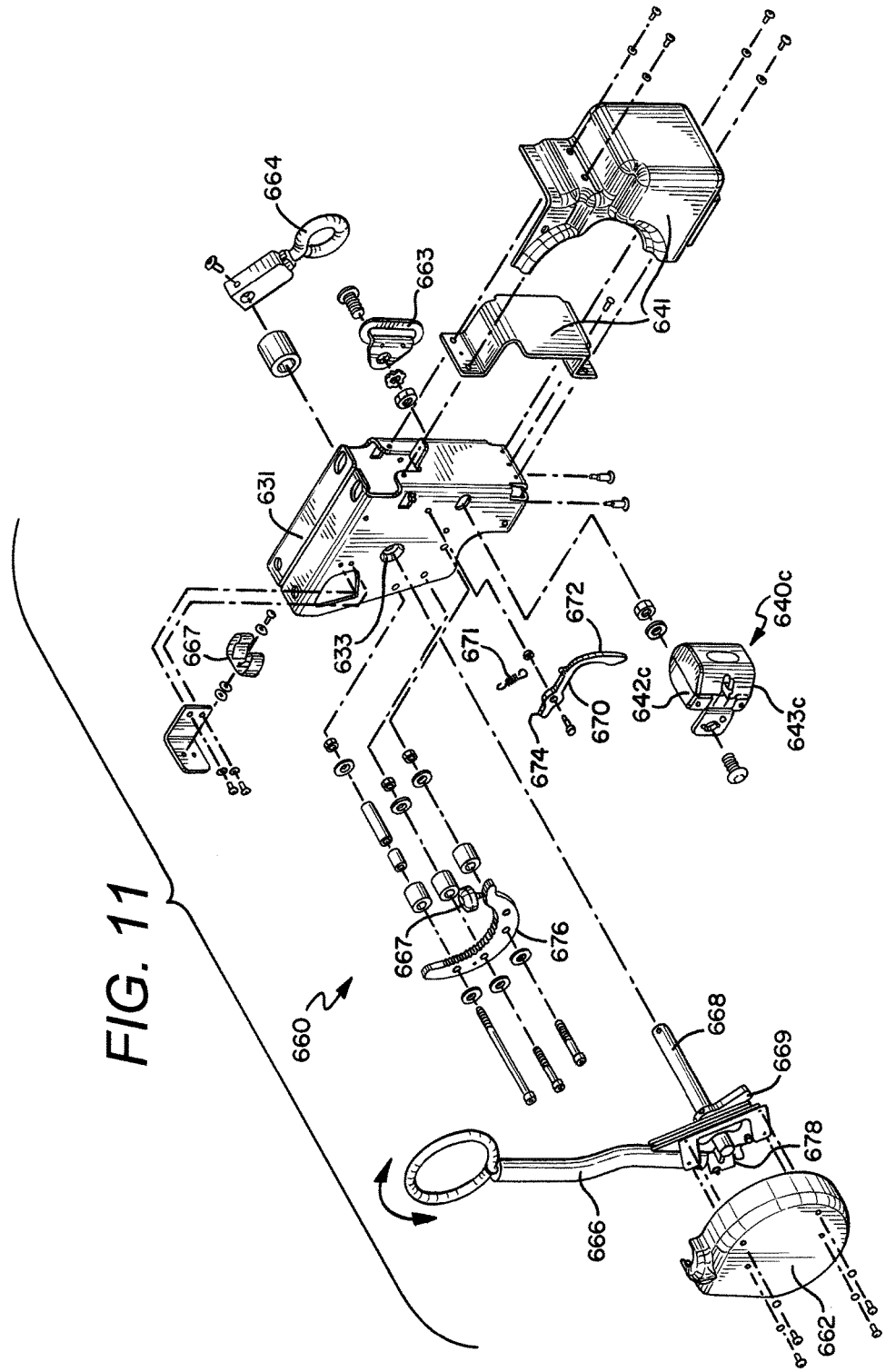
FIG. 11 is an exploded view of the tensioning mechanism of the sixth embodiment.

More specifically, the wheelchair securement system 610 includes three securement (or tie-down) assemblies 640a, 640b, 640c which work in conjunction to adequately secure a wheelchair in compliance with the ADA. As best shown in FIGS. 10 and 11, each of the three securement assemblies 640a, 640b, 640c comprises a retractor 642a, 642b, 642c. Retractors 642a, 642b are mounted internal to the barrier module 620, and retractor 642c is mounted to the side-wall barrier 630 inside of a housing assembly 641. Each retractor 642a, 642b, 642c includes several feet of webbing (or strap) 644a, 644b, 644c, at a terminal end of which is provided a wheelchair engaging member 646a, 646b, 646c which could be any type of fastener. At least the front retractor 642c includes a locking mechanism and a lever, or actuator, 643c. The locking mechanism prevents the webbing 644c from being pulled out of the retractor 642, and depressing the lever 643c overrides the locking mechanism and allows the webbing 644c to be extended.

Like the second embodiment, the sixth embodiment of the wheelchair securement system 610 also includes at least one side barrier or pad 634. The side barrier 634 can be constructed of any material, although as shown the side barrier comprises a rubber (or neoprene) material. As shown, the side barrier 634 includes a recessed area 635 adjacent the barrier module 620, and a projected area 636 near the front securement assembly 640c, to accommodate or conform to the shape of a wheelchair which is wider at the rear and more narrow at the front. However, it is anticipated the side barrier 634 could be flat without the recessed area. The contact/side barrier 634 is preferably positioned adjacent or near a floor of the vehicle, underneath a side seating arrangement, but can be adjusted up or down to accommodate different seating options.

With particular reference now to FIGS. 11-15, the sixth embodiment includes a second embodiment of a front restraint mechanism 660, disposed within housings 662 and 641, that is adapted to pull the wheelchair towards or into contact with the side barrier 634 through use of the strap guide 664. The refractor 642c, as shown, is mounted to the frame structure 631 for the side-wall module 630, positioned slightly forward of the strap guide 664 and a loop member 663, which is affixed to the frame structure 631. In this configuration, the strap 644c extends from the refractor 642c, through the loop member 663, then through the strap guide 664, and finally to the wheelchair, where the wheelchair engaging member 646c is attached to the wheelchair. The strap guide 664 is interconnected with a handle actuator 666 by means of shaft 668. Shaft 668 is rigidly fixed to both the strap guide 664 and the handle actuator 666, and extends through an aperture 633 through the frame structure 631. With this configuration, it is readily obvious that rotation of the handle actuator 666 about the axis of the shaft 668 causes the strap guide 664 to rotate in a similar direction. More specifically, pulling the handle actuator 666 away from the vehicle wall (i.e., clockwise about axis of shaft 668, in direction C) causes the strap guide 664 to rotate in a direction generally towards the vehicle wall, thereby drawing up any slack in the strap 664c and pulling the wheelchair adjacent to or flush up against the side barrier 634. In this configuration, the wheelchair is most secure since tension is introduced into the restraints 640a, 640b, 640c and the close positional relationship or contact between the barrier 634 and the wheelchair will limit lateral movement towards the wall, both during normal and emergency driving events.

The mechanism 660 includes components which are configured to engage with the lever 643c on the front retractor 642c. Specifically, when the securement system 610 is not being used (i.e., when the handle actuator 666 is positioned generally vertical in engagement with spring lock 667), the mechanism 660 is configured to depress lever 643c, thereby allowing the strap 644c to be withdrawn from the refractor 642c. Lever 643c is depressed using link 670 which is pivotably attached to the frame assembly. Spring 671 is interconnected between the frame structure 631 and the first, or lower portion, 672 of the link 670 to bias the lower portion 672 of the link 670 away from the lever 643c. Therefore, in its default state, lever 643 is not depressed. However, the mechanism includes cam member 669 which is rigidly fixed to shaft 668. When the handle actuator 666 is positioned generally vertical (i.e., the unlocked/unrestrained position), the cam member 669 engages with the underside of the second, or upper portion, 674 of the link to force the lower portion 672 of the link towards and into engagement with lever 643c. See, in particular, the cross section in FIG. 15, which shows cam member 669 forcing link 670 into engagement with lever 643c. In that respect, when the station is not being use, and the handle actuator 666 is in the unlocked/unrestrained position, the strap 644c can be readily withdrawn from the refractor 642c so that the fastener 646c can be engaged with a wheelchair. One of ordinary skill in the art would recognize that when handle actuator 666 is pulled in direction C (to the locked/restrained position), cam member 669 rotates in the same direction, thereby allowing spring 671 to pull the first portion 672 of link 670 away from engagement with lever 643c. When this occurs, the locking mechanism of the refractor 642c is engaged, which prevents further strap 644c from being withdrawn.

Figure 12:
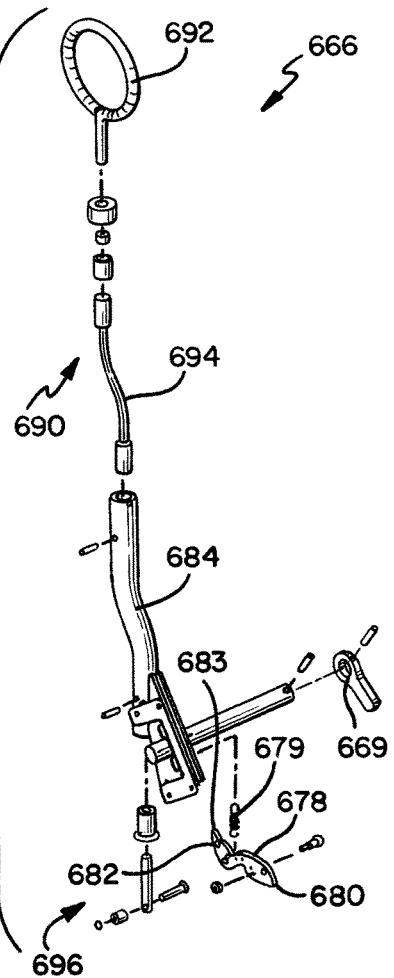
FIG. 12 is an exploded view of the handle actuator for the tensioning mechanism of the sixth embodiment.
Figure 13:
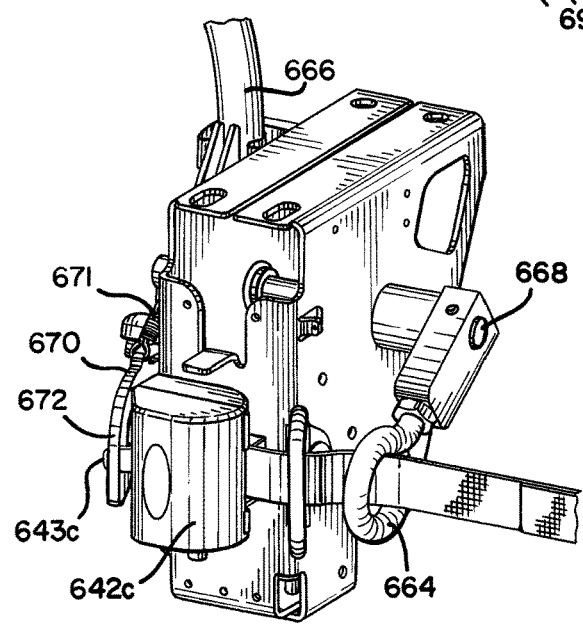
FIG. 13 is a first perspective view of the tensioning mechanism with certain panels removed for purposes of clarity.
Figure 14:
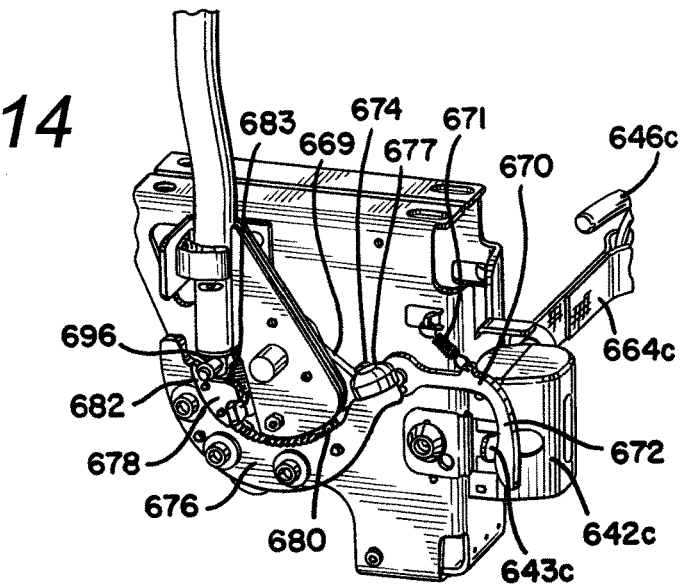
FIG. 14 is a second perspective view of the tensioning mechanism with certain panels removed for purposes of clarity.
Figure 15:
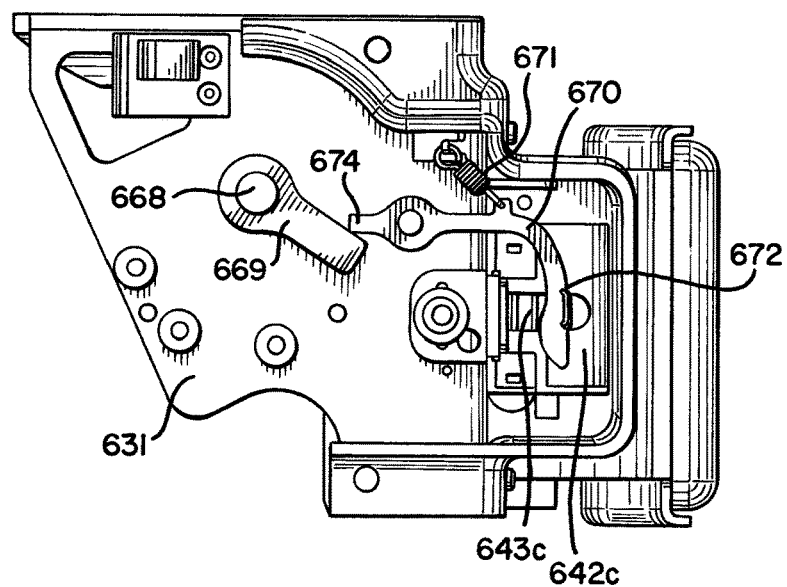
FIG. 15 is a cross sectional view of the tensioning mechanism.

With reference now, in particular, to FIGS. 11, 12, and 14, the mechanism 660 includes a ratchet 676 and pawl 678, which work in conjunction to allow the handle to be pulled clockwise, in direction C, but prevent the handle from moving counterclockwise. More specifically, the ratchet 676 is rigidly affixed to the frame structure 631, and includes a stop 677 to prevent over-rotation of the handle actuator 666 (or can be adjusted to limit the travel of the handle 666), while the pawl 678 is pivotably affixed to a lower end of the handle actuator 666. A spring 679 is provided, which is interconnected between the pawl 678 and the handle actuator 666 and biases a first end 680 of the pawl 678 into engagement with the ratchet 676.

The handle actuator 666 includes a ratchet release mechanism, 690, comprising a handle 692 which is connected to a cam follower 696, via a torsion member 694. The torsion member extends from the handle 692 to the cam follower 696 through the tubular body 684 of the handle actuator 666. The handle is configured to rotate in at least one direction D about the axis of the tubular body 684 to facilitate engagement of pawl 678 with ratchet 676. More specifically, torsion member 694 transmits the torque exerted upon the handle 692 to cam follower 696 whereby rotation of handle 692 causes cam follower 696 to rotate about the axis of the tubular body 684. Cam follower 696 engages with cam surface 683 which is present on a second end 682 of the pawl 678. When handle 682 is rotated counterclockwise, cam follower 696 rides along cam surface 683 and forces the second end 682 of the pawl 678 downward, whereby the first end 680 of the pawl 678 moves upward and out of engagement with the ratchet 676.

As with some of the previous embodiments, the sixth embodiment of the barrier module 620 includes a remote control device (or timed release mechanism) with a release latch (or paddle handle or release handle) 622 for releasing one or more of the securement assemblies 640a, 640b, 640c, such as any one of the systems described in U.S. provisional patent application Ser. Nos. 60/705,452, U.S. provisional patent application No. 60/618,572, U.S. patent application Ser. No. 11/252,326, and/or PCT patent application no. PCT/US06/30085. In the shown embodiment, paddle handle 622 releases the locking mechanisms of retractors 642a, 642b for a predetermined amount of time, which is sufficient for the vehicle operator to engage/release the fasteners 646a, 646b with/from the wheelchair.

Proper restraint of a wheelchair in the sixth embodiment of the system 610 can be achieved using the following steps. First, the side seat should be placed and locked in the folded, upward position. Second, the wheelchair is moved into position with the back of the passenger placed adjacent the barrier module 620, and the wheelchair positioned in the center of the area, as close as possible to the side barrier 634 (ideally in contact with the side barrier 634). Third, the paddle handle 622 is pulled, which releases the locking mechanisms of retractors 642a, 642b for a predetermined period of time. Fourth, webbing 644a, 644b is withdrawn and fasteners 646a, 646b are attached to structural members of the wheelchair. Preferably, and as described in more detail above for the second embodiment, fastener 646a engages with the wheelchair in the rear right-side quadrant 652a, and the fastener 646b engages with the wheelchair in the rear left-side quadrant 652b. Fifth, the vehicle operator should verify that the handle actuator 666 is in its unlocked/unrestrained position, so that the locking mechanism of retractor 642c is disengaged and webbing 644c can be withdrawn. As shown, the handle actuator 666 is in its unlocked/unrestrained position when it is generally vertical and held in place by spring lock 667. Then webbing 644c is withdrawn and fastener 646c engages with the wheelchair in the front right-side quadrant 152c (i.e., the quadrant adjacent the wall of the vehicle). Sixth, preferably after the predetermined period of time has elapsed, the handle actuator 666 is pulled in direction C. This action simultaneously causes the locking mechanism of refractor 642c to engage (and thereby prevent further withdrawal of webbing 646c) and the strap guide 664 to pull webbing 644c towards the wall of the vehicle (and thereby remove slack from at least webbing 644c). Engagement of the ratchet 676 and pawl 678 holds the handle actuator 666 in the locked/restrained position. Finally, once everything is secured and in position, the wheelchair wheel locks are then engaged or power supply is turned off. In its final, restrained position, the wheelchair is positioned very close to or ideally in contact with the side barrier 634.

When the wheelchair passenger decides to disembark the vehicle, the above steps are essentially performed, but in reverse order. First, the handle 692 of the handle actuator 666 is rotated to disengage the pawl 678 from the ratchet 676. This allows the handle actuator 666 to be moved back to its original unlocked/unrestrained position. Once this step is performed, the locking mechanism of refractor 642c is once again released, which allows the fastener 646c to be removed from the wheelchair and the webbing 644c to be drawn back into the refractor 642c. Second, the paddle handle 622 is once again pulled, which allows fasteners 646a, 646b to be removed from engagement with the wheelchair and webbing 644a, 644b to be drawn back into the refractors 642a, 642b. Finally, the vehicle operator removes the wheelchair wheel locks or turns power supply on for electric wheelchairs and the wheelchair passenger is now free to disembark the vehicle.

Figure 16:
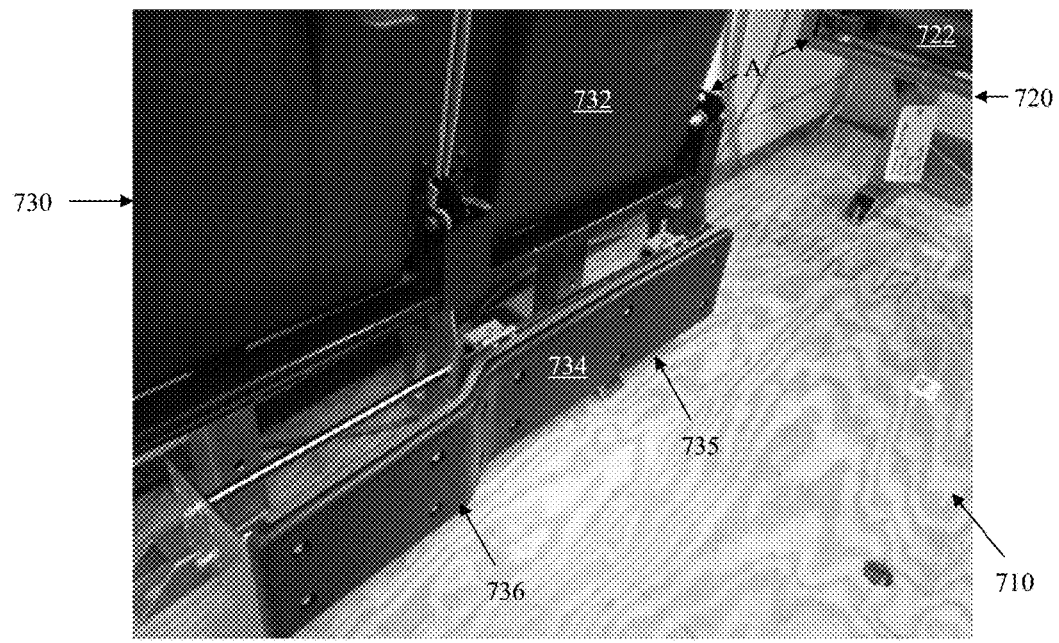
FIG. 16 is a perspective view of an alternative, movable side barrier for the sixth embodiment that slides from a first, unsecured position (shown) to a second, secured position.
Figure 17:
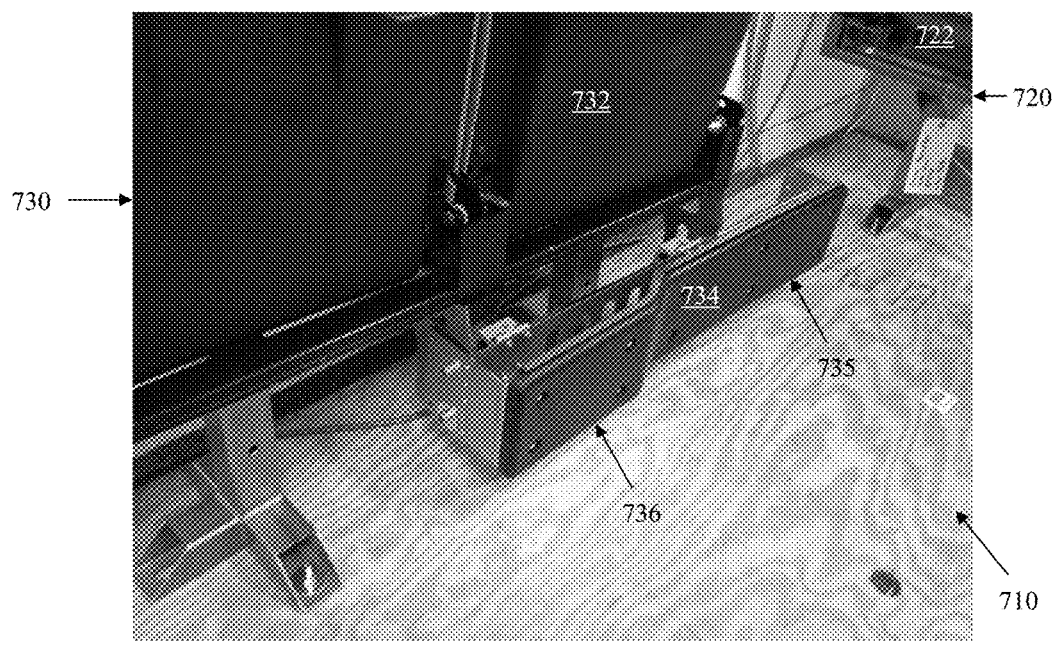
FIG. 17 is a perspective view of the sliding side barrier shown in the second, secured position.

Turning now to FIGS. 16-17, a seventh embodiment of the wheelchair securement station 710 is shown. Like the sixth embodiment, the seventh embodiment includes a barrier module 720 and a side-wall module 730, and uses three points of attachment to the wheelchair, which work in conjunction with a side barrier 734 and/or a front restraint mechanism, or tensioner assembly, to adequately secure the wheelchair in compliance with the ADA and to prevent significant movement, twisting, or tipping of the wheelchair. Like the side barrier 634 of the sixth embodiment, the side barrier 734 includes a recessed area 735 adjacent the barrier module 720, and a projected area 736 near the front securement assembly (not shown).

However, the seventh embodiment differs from the sixth embodiment in several ways. For example, the barrier module 720 includes a two-place flip-seat 722. In addition, because the barrier module 720 includes a flip-seat 722, the side-wall module 730 must be spaced a distance "A" from the barrier module 720 to accommodate the flip-seat 722 and the seated passenger's legs. In this embodiment, the side-wall module 730 is shown having a two-place flip-seat 732, but can include a three-place flip-seat (not shown). In either case, the barrier module 720 is spaced a distance "A" from the side-wall module 730.

Figure 9:
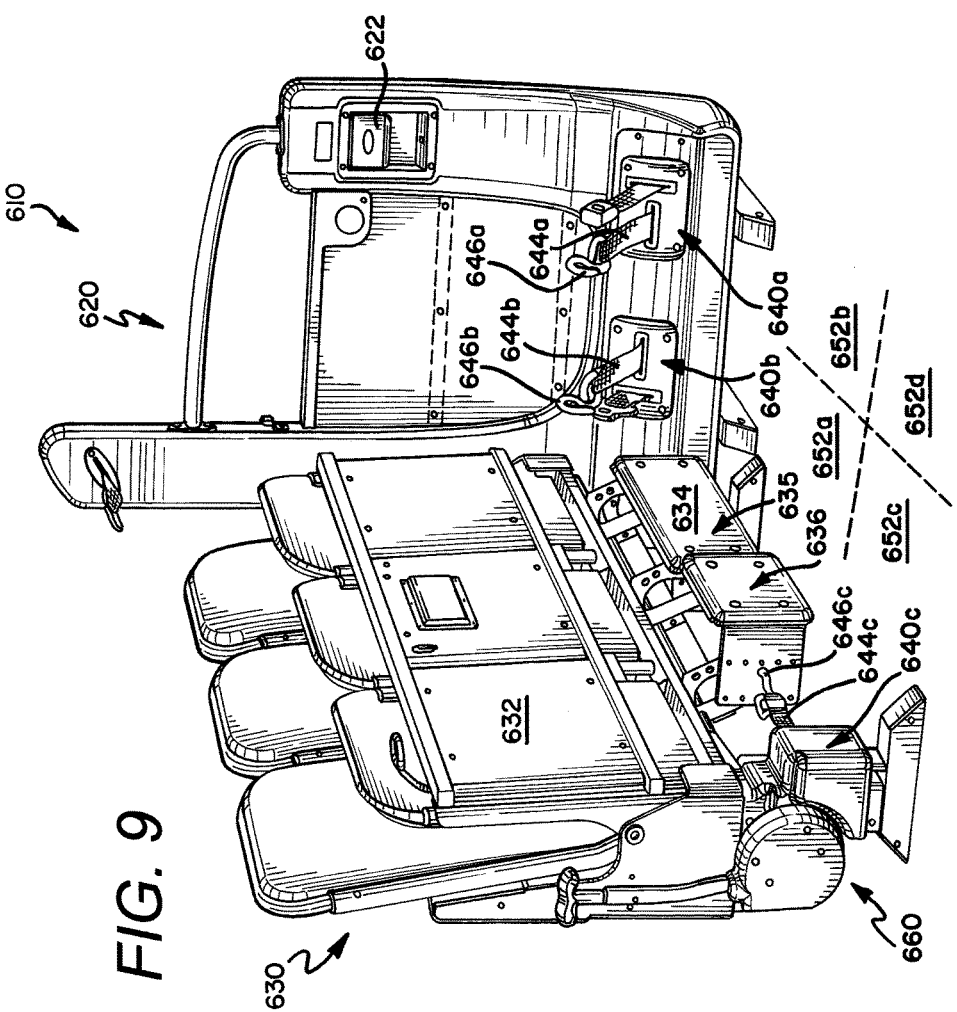
FIG. 9 is a perspective view illustrating a sixth embodiment of the three-point wheelchair securement system, which includes a barrier module, a side-wall module, and a tensioning mechanism.

As can be seen with reference to the sixth embodiment in FIG. 9, placement of the side barrier 634 toward a rear of the securement area (near the barrier module 620), where the barrier 634 is adjacent a rear wheel of a secured wheelchair, is most desirable to prevent wheelchair tipping during an accident scenario. The same configuration is desired for the side barrier 734 of the seventh embodiment. However, placement of a stationary side barrier in this position in the seventh embodiment would be problematic when the wheelchair securement system is not being used. More specifically, the side barrier would intrude into the legroom for a passenger sitting in the two-place flip-seat 722 of the barrier module 720. To solve this problem, the side barrier 734 of the seventh embodiment is movable. In that regard, the side barrier 734 is dubbed a "sliding side barrier" as it is designed to slide from a first, refracted (or stored) position as shown in FIG. 16 (under the side-wall flip seat) to a second, extended (or wheelchair-securable) position as shown in FIG. 17 (where it extends into the space "A"). Like the side barrier 634, the side barrier 734 can be constructed of any material, although as shown the side barrier comprises a rubber (or neoprene) material. However, it is contemplated that the side barrier 734 can be constructed of a rigid material, such as metal.

In the shown embodiment, the side barrier 734 includes rails that slide through brackets fastened to the underside of the side-wall module 730, although the bracket may be fastened to any portion of the side-wall module 730, or even to other structures of the vehicle. The side barrier 734 is biased in the first, retracted (or stored) position using springs, actuators, struts or other mechanisms designed to resist or exert longitudinal compression and can be moved to the second, extended position by hand or foot and locked in place using a latch.

Figure 18:
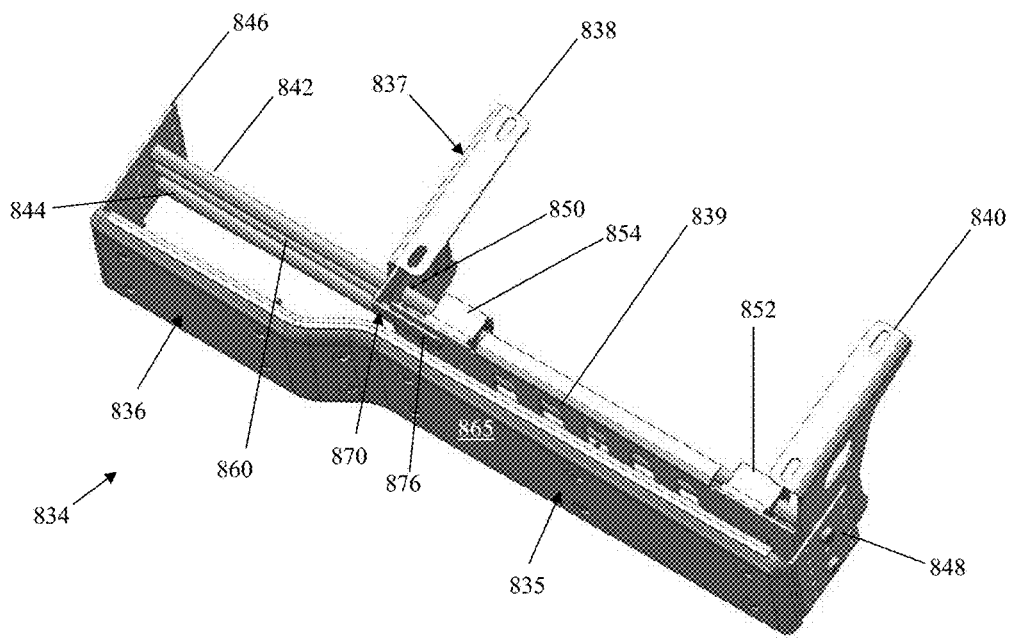
FIG. 18 is a perspective view of a second alternative, movable side barrier for a seventh embodiment that is shown in its first, retracted position.
Figure 19:
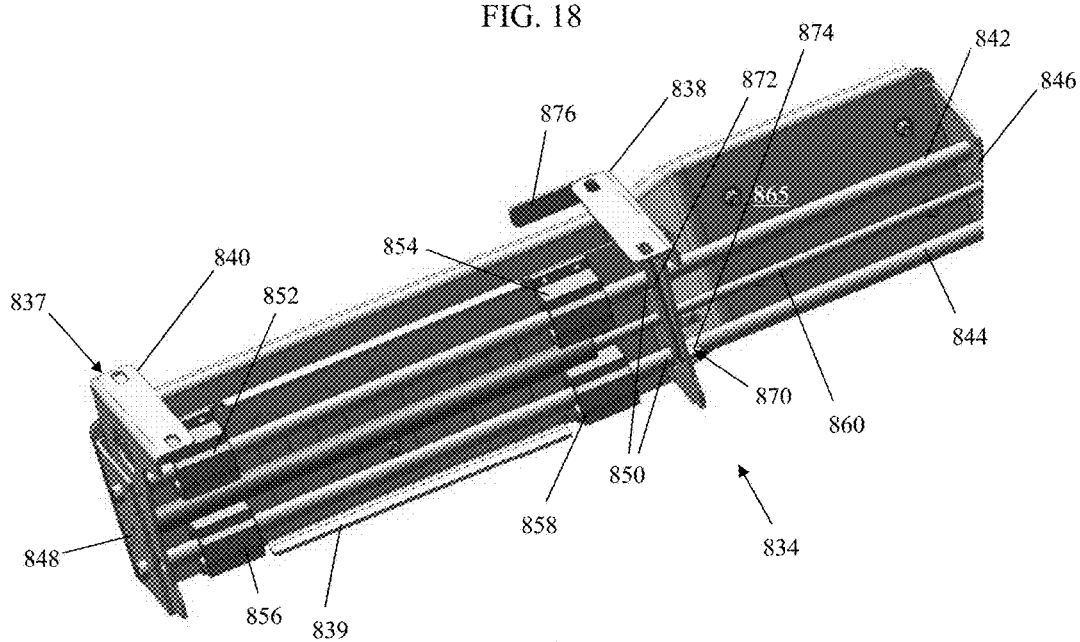
FIG. 19 is a second perspective view of the second alternative, movable side barrier for a seventh embodiment that is shown in its first, retracted position.
Figure 20:
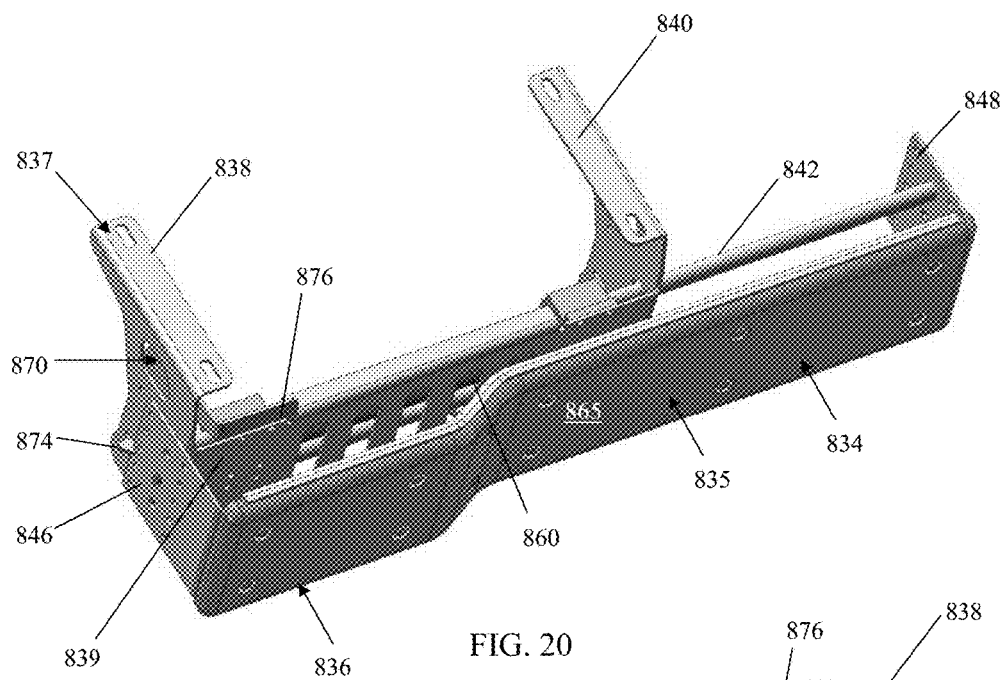
FIG. 20 is a perspective view of the second alternative, movable side barrier for a seventh embodiment that is shown with the bumper slid into its second, extended position; and, FIG. 21 is a perspective view of the second alternative, movable side barrier for a seventh embodiment that is shown with the bumper slid into its second, extended position.
Figure 21:
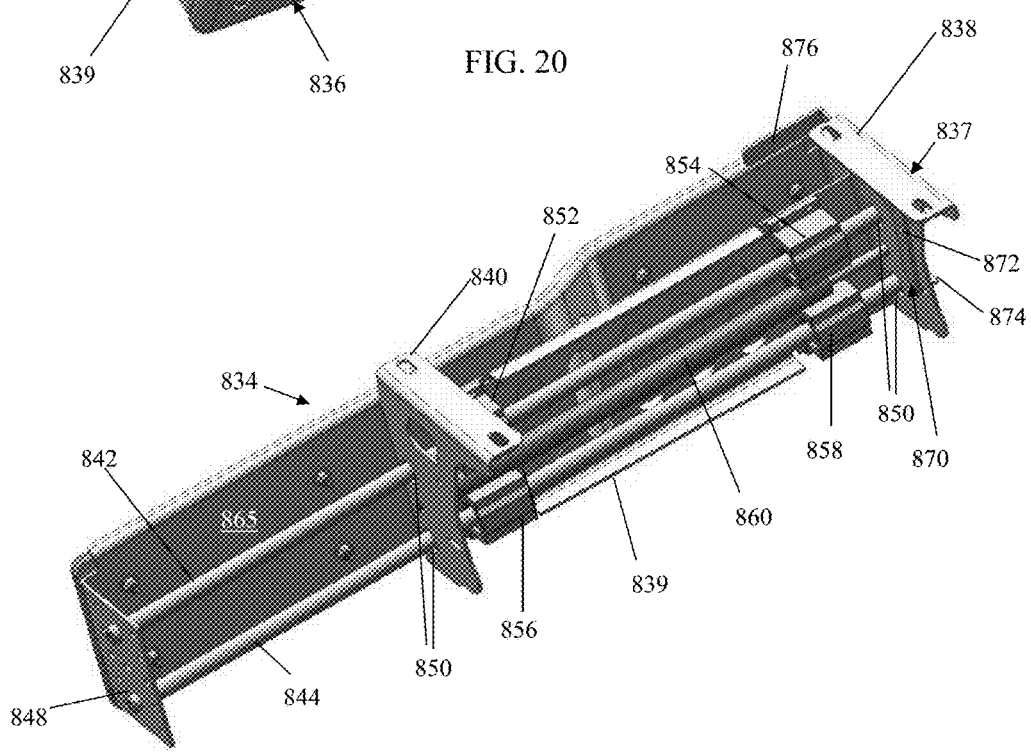

An eighth embodiment includes the side barrier assembly 834 depicted in FIGS. 18-21. In particular FIGS. 18 and 19 show the side barrier assembly 834 with bumper 865 in a retracted position and FIGS. 20 and 21 show the bumper 865 in an extended position. Like the side barrier 734 of the seventh embodiment, the bumper 865 includes a recessed area 835 adjacent the barrier module (not shown), and a projected area 836 near the front securement assembly (not shown). The side barrier assembly 834 includes a bracket 837 with two flanges 838 and 840 for securing the side barrier assembly 834 to the underside of the side-wall module, although the flanges 838 and 840 can be fewer or greater in number and can be configured for securement to other structures of the side-wall module or to other structures in the vehicle, including the floor and wall of the vehicle. In the shown embodiment, the bracket 837 is formed from a single piece of sheet metal, whereby the flanges 838 and 840 are connected by plate member 839. Notwithstanding the foregoing, it is contemplated that the flanges 838 and 840 can be separate structures formed from separate pieces of sheet metal, and need not be interconnected as shown.

The bumper 865 includes two rails 842 and 844 that facilitate sliding movement. The rails 842 and 844 extend from one end 846 of the bumper 865 to the other end 848, and are secured to both ends 846 and 848. The rails 842 and 844 extend through aperatures 850 in the flanges 838 and 840 and through bearings 852, 854, 856, and 858, each of which are affixed to the plate member 839. In the shown embodiment, the bearings 852, 854, 856, and 858 are recirculating bearings, although other types of bearings or roller mechanisms may be used to reduce friction and provide smooth sliding operation of the bumper 865. The side-barrier 834 also includes a biasing member 860, which in this case is a gas strut, that is affixed at one end to flange 838 and at the other end to end 846 of the bumper 865. The biasing member 860 is configured to bias the bumper 865 in the retracted position as shown in FIGS. 18-19. It is intended that the bumper 865 can be moved from the refracted position (FIGS. 18-19) to the extended position (FIGS. 20-21) through modest pressure exerted by hand or foot. Flange 838 is provided with a locking mechanism 870 to hold the bumper 865 in the extended position. As shown, locking mechanism 870 is a lever that is affixed to the flange 838 at pivot point 872. At one end, the locking mechanism 870 includes a notched finger 874 with an angled leading edge that catches the edge of end 846 of the bumper as it is pushed into the extended position. The engagement of finger 874 with the end 846 is best shown in FIG. 20. The locking mechanism 870 includes a biasing member, such as a spring (hidden from view), that holds the notched portion of finger 874 in engagement with the end 846. The end of the locking mechanism 870 opposite the finger 874 includes a release handle 876. Pulling the release handle 876 releases the notch of the finger 874 from engagement with the bumper 865, upon which the force of the biasing member 860 causes the bumper 865 to return to its refracted position (FIGS. 18-19).

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A securement system adapted for securing a mobility aid in a vehicle, the securement system comprising:
    a first mobility aid restraint, a second mobility aid restraint, a bumper, and a tensioning mechanism that are configured to cooperate to resist movement of the mobility aid;
    whereby the first mobility aid restraint is adapted to extend between and attach at one end to the vehicle and at the other end directly to the mobility aid for securing the mobility aid during transit;
    the first mobility aid restraint comprises a first retractor and the second mobility aid restraint comprises a second retractor, wherein the first and second retractors are self-tensioning;
    the first mobility aid restraint is angled slightly upward with the one end being at a lower elevation than the other end, whereby the first mobility aid restraint is adapted to exert a downward force on the mobility aid;
    the bumper is not directly attached to the mobility aid, is adapted as a touch point between the vehicle and the mobility aid for restraining the mobility aid during transit, and is adapted to be positioned at least partially between the first retractor and the second retractor; and,
    the tensioning mechanism is adapted to induce tension into the first mobility aid restraint, whereby the first mobility aid restraint exerts a force on the mobility aid in a direction at least partly toward the bumper.

2. The securement system of claim 1 further comprising at least one module, wherein at least one of: (a) the first mobility aid restraint, (b) the second mobility aid restraint, and (c) the bumper are fixed to the at least one module.

3. The securement system of claim 2, wherein the tensioning mechanism is separate from the first mobility aid restraint and the second mobility aid restraint.

4. The securement system of claim 1, wherein the vehicle has a mobility aid securement area with a front side, a rear side, a wall side, and an aisle side.

5. The securement system of claim 4, wherein the first mobility aid restraint is adapted to be secured in the vehicle adjacent the aisle side of the mobility aid securement area.

6. The securement system of claim 5, wherein the bumper is adapted to be secured in the vehicle adjacent the wall side of the mobility aid securement area.

7. The securement system of claim 4, wherein the second mobility aid restraint is adapted to be secured in the vehicle adjacent the rear of the mobility aid securement area.

8. The securement system of claim 7, wherein the bumper is adapted to be secured in the vehicle adjacent the wall side of the mobility aid securement area.

9. A securement system adapted for securing a mobility aid in a vehicle, the securement system comprising:

a mobility aid restraint, a bumper, and a tensioning mechanism that are configured to cooperate to resist movement of the mobility aid;

at least one module, wherein at least one of: (a) the mobility aid restraint and (b) the bumper are fixed to the at least one module;

the at least one module comprises a wall-side module and a barrier module, wherein the mobility aid restraint is fixed to the wall-side module;

whereby the mobility aid restraint is adapted to extend between and attach at one end to the vehicle and at the other end directly to the mobility aid for securing the mobility aid during transit;

the mobility aid restraint is angled slightly upward with the one end being at a lower elevation than the other end, whereby the mobility aid restraint is adapted to exert a downward force on the mobility aid;

the bumper is not directly attached to the mobility aid and is adapted as a touch point between the vehicle and the mobility aid for restraining the mobility aid during transit; and, the tensioning mechanism is adapted to induce tension into the mobility aid restraint, whereby the mobility aid restraint exerts a force on the mobility aid in a direction at least partly toward the bumper.

10. The securement system of claim 9, wherein the bumper is fixed to the wall-side module.

11. A securement system adapted for securing a mobility aid in a vehicle, the securement system comprising:

a mobility aid restraint, a bumper, and a tensioning mechanism that are configured to cooperate to resist movement of the mobility aid;

at least one module, wherein at least one of: (a) the mobility aid restraint and (b) the bumper are fixed to the at least one module;

the at least one module comprises a wall-side module and a barrier module, wherein the mobility aid restraint is fixed to the barrier module;

whereby the mobility aid restraint is adapted to extend between and attach at one end to the vehicle and at the other end directly to the mobility aid for securing the mobility aid during transit;

the mobility aid restraint is angled slightly upward with the one end being at a lower elevation than the other end, whereby the mobility aid restraint is adapted to exert a downward force on the mobility aid;

the bumper is not directly attached to the mobility aid and is adapted as a touch point between the vehicle and the mobility aid for restraining the mobility aid during transit; and, the tensioning mechanism is adapted to induce tension into the mobility aid restraint, whereby the mobility aid restraint exerts a force on the mobility aid in a direction at least partly toward the bumper.

12. The securement system of claim 11, wherein the bumper is fixed to the wall-side module.

13. A securement system adapted for securing a mobility aid in a vehicle, the securement system comprising:

a mobility aid restraint, a bumper, and a tensioning mechanism that are configured to cooperate to resist movement of the mobility aid;

whereby the mobility aid restraint is adapted to extend between and attach at one end to the vehicle and at the other end directly to the mobility aid for securing the mobility aid during transit;

the mobility aid restraint is angled slightly upward with the one end being at a lower elevation than the other end, whereby the mobility aid restraint is adapted to exert a downward force on the mobility aid;

the bumper is not directly attached to the mobility aid and is adapted as a touch point between the vehicle and the mobility aid for restraining the mobility aid during transit; and, the tensioning mechanism is adapted to induce tension into the mobility aid restraint, whereby the mobility aid restraint exerts a force on the mobility aid in a direction at least partly toward the bumper, wherein the tensioning mechanism is separate from the at least one mobility aid restraint.

* * * * *